United States Patent
Gerphagnon et al.

(10) Patent No.: US 10,152,365 B2
(45) Date of Patent: Dec. 11, 2018

(54) METHOD AND SEQUENCER FOR DETECTING A MALFUNCTION OCCURRING IN A HIGH PERFORMANCE COMPUTER

(71) Applicant: BULL SAS, Les-Clayes-Sous-Bois (FR)

(72) Inventors: Jean Olivier Gerphagnon, Vif (FR); Sylvain Jeaugey, Meylan (FR); Philippe Couvee, Villard Bonnot (FR)

(73) Assignee: BULL SAS, Les Clayes-Sous-Bois (FR)

( * ) Notice: Subject to any disclaimer, the term of this patent is extended or adjusted under 35 U.S.C. 154(b) by 214 days.

(21) Appl. No.: 14/944,385

(22) Filed: Nov. 18, 2015

(65) Prior Publication Data
US 2016/0139973 A1     May 19, 2016

(30) Foreign Application Priority Data
Nov. 18, 2014 (FR) .................................. 14 61095

(51) Int. Cl.
| | |
|---|---|
| *G06F 11/00* | (2006.01) |
| *G06F 11/07* | (2006.01) |
| *G06F 11/22* | (2006.01) |
| *G06F 11/34* | (2006.01) |

(52) U.S. Cl.
CPC ........ *G06F 11/079* (2013.01); *G06F 11/0709* (2013.01); *G06F 11/0751* (2013.01); *G06F 11/0787* (2013.01); *G06F 11/2242* (2013.01); *G06F 11/3409* (2013.01)

(58) Field of Classification Search
USPC ....................................................... 714/47.1
See application file for complete search history.

(56) References Cited

U.S. PATENT DOCUMENTS

| | | | | |
|---|---|---|---|---|
| 7,584,116 | B2 * | 9/2009 | Kakouros | G06Q 30/0202 705/7.31 |
| 8,243,609 | B2 * | 8/2012 | Sakurai | B60W 50/02 370/242 |
| 8,966,325 | B2 * | 2/2015 | Hopper | G06F 11/008 714/25 |
| 9,430,308 | B2 * | 8/2016 | Cuthbert | H04L 43/0811 |
| 2004/0010790 | A1 * | 1/2004 | Wilson | G06F 9/546 719/310 |

(Continued)

OTHER PUBLICATIONS

French Search Report as issued in French Patent Application No. 1461095, dated Nov. 23, 2015.

*Primary Examiner* — Amine Riad
(74) *Attorney, Agent, or Firm* — Pillsbury Winthrop Shaw Pittman LLP

(57) ABSTRACT

A method for monitoring the operation of an IT infrastructure including a plurality of calculation nodes, includes selecting calculation nodes for performing a calculation, performing the calculation via the selected calculation nodes, attributing, via the sequencer, a score to each one of the calculation nodes having participated in the calculation performed, with each score reflecting a difference between a measured operating parameter of the calculation node for which the score is attributed and a reference operating parameter of the calculation node for which the score is attributed, verifying the operation of the calculation nodes having participated in the calculation performed, the verification being carried out using scores attributed to the calculation nodes having participated in the calculation.

7 Claims, 3 Drawing Sheets

(56) References Cited

U.S. PATENT DOCUMENTS

| | | | |
|---|---|---|---|
| 2007/0033441 A1 | 2/2007 | Sathe et al. | |
| 2010/0161281 A1 | 6/2010 | Brown et al. | |
| 2010/0299419 A1 | 11/2010 | Ramankutty et al. | |
| 2011/0285516 A1* | 11/2011 | Ritter | H04W 88/04 340/286.02 |
| 2013/0124669 A1* | 5/2013 | Anderson | G06F 11/3006 709/217 |
| 2013/0219223 A1* | 8/2013 | Jiang | G06F 11/079 714/37 |
| 2013/0226446 A1* | 8/2013 | Nonner | G01C 21/00 701/400 |
| 2014/0280899 A1* | 9/2014 | Brewster, Jr. | H04L 43/0817 709/224 |
| 2017/0126472 A1* | 5/2017 | Margalit | H04L 41/0604 |

* cited by examiner

METHOD AND SEQUENCER FOR DETECTING A MALFUNCTION OCCURRING IN A HIGH PERFORMANCE COMPUTER

CROSS-REFERENCE TO RELATED APPLICATIONS

This application claims priority to French Patent Application No. 1461095, filed Nov. 18, 2014, the entire content of which is incorporated herein by reference in its entirety.

FIELD

This invention relates to a method and to a sequencer for monitoring the operation of an IT infrastructure comprising a plurality of calculation nodes. Such an infrastructure is also referred to as a high performance computer and is implemented for performing high performance calculations, also referred to as HPC (High Performance Computing).

BACKGROUND

Computing of the high performance type has been developed for university research as well as for industry, in particular in the technical fields such as the automobile, aeronautics, energy, climatology and the life sciences. Modelling and simulating make it possible in particular to reduce the costs of development, accelerate putting on the market products that are innovative, more reliable and that consume less energy. For researchers, high performance computing has become an indispensable means of investigation.

Computers of the high performance type are formed by combining together calculation nodes that each gather together several processors. These computers as such consistent in multiplying the calculation nodes, in such a way as to simultaneously execute a large number of calculations. As shown in FIG. 1, these computers 1 known in prior art typically comprise several calculation nodes 2 each comprising a network controller 3 and are connected together by an interconnection network 4. Moreover, a management network 5 interacts with the calculation nodes 2 in order to configure them, monitor them and administer them.

In computers of the high performance type, comprised for the largest of them of a few tens of thousands of calculation nodes, one of the most difficult problems to resolve is to identify the calculation nodes that have intermittent malfunctions, which affect the calculations only indirectly (slower calculations, incorrect calculations, etc.). Furthermore, the number of breakdowns increases exponentially with the number of calculation nodes that the computer contains.

A breakdown of a calculation node can in particular be caused by the failure of a hardware component such as a central processing unit (CPU), a memory or electrical power supply, or by a defect (typically called a bug) of a software component implemented by the calculation node considered or by infrastructure elements.

An existing solution, when it is suspected that the computer is slowed down, is to launch an analysis consisting in performing a dichotomous succession of calculations within the high performance computer in order to isolate the defective node. When a dichotomous succession of calculations is launched, the computer cannot be used for purposes other than that of diagnostic. Consequently, this analysis requires the exclusive use of the high performance computer and is therefore very expensive.

SUMMARY

An aspect of the invention therefore is directed to overcoming the disadvantages of prior art. In this context, an aspect of the invention in particular has for purpose to provide a method for monitoring the operation of an IT infrastructure comprising a plurality of calculation nodes, with the implementation of the method for monitoring not requiring the monopolisation of the IT infrastructure in order to carry out an operating diagnostic.

For this purpose, an embodiment of the invention is directed to a method for monitoring the operation of an IT infrastructure comprising a plurality of calculation nodes, the method for monitoring comprising:
- selecting, via a sequencer, calculation nodes in order to perform at least one calculation,
- performing the calculation via the selected calculation nodes,
- attributing, via the sequencer, a score to each one of the calculation nodes having participated in the calculation performed, with each score reflecting a difference between a measured operating parameter of the calculation node for which the score is attributed and a reference operating parameter of the calculation node for which the score is attributed,
- verifying, via the sequencer, the operation of the calculation nodes having participated in the calculation performed, the verification being carried out using scores attributed to the calculation nodes having participated in said calculation.

In a non-restricted implementation, the method for monitoring comprises the initial steps of launching a reference calculation on at least one calculation node, then of determining a reference operating parameter of said calculation node.

The scores are attributed during a standard usage of the IT infrastructure. More particularly, the step of attributing scores and the step of verifying the operation are implemented during the performing of calculations. It is therefore not necessary to monopolise all of the calculation nodes of the IT infrastructure (or computer of the high performance type also referred to as supercomputer), or even a portion of the calculation nodes over a long period in order to carry out an operating diagnostic of the calculation nodes. The monitoring of the operation of all of the nodes is therefore inexpensive since this monitoring is carried out even when the computer is performing calculations.

The method for monitoring the operation of an IT infrastructure according to an embodiment of the invention can also have one or several of the characteristics hereinafter, considered individually or according to all technically permissible combinations.

In a non-restricted implementation, the method further comprises the initial steps of launching a reference calculation on at least one calculation node, then of determining a reference operating parameter of said at least one calculation node.

In a non-restricted implementation, the operating parameter is formed by the number of errors corrected by a calculation node in order to perform a calculation.

In a non-restricted implementation, the reference operating parameter is formed by the number of errors corrected by a calculation node in order to perform a calculation.

In a non-restricted implementation, the operating parameter is formed by the time taken by a calculation node in order to perform a calculation.

In a non-restricted implementation, the reference operating parameter is formed by the time taken by a calculation node in order to perform a calculation.

In a non-restricted implementation, the steps of selecting, performing and attributing are reiterated in such a way that the step of verifying is carried out for each one of the calculation nodes using a plurality of scores attributed to each one of the calculation nodes having performed a plurality of calculations.

In a non-restricted implementation, the verification of the operation is carried out by calculating, for a calculation node, an average of a plurality of scores attributed for the performing of a plurality of calculations.

An aspect of the invention concerns a sequencer for monitoring the operation of an IT infrastructure, the sequencer being constructed and arranged in order to implement the method for monitoring the operation of an IT infrastructure according to an embodiment of the invention.

BRIEF DESCRIPTION OF THE FIGURES

Other characteristics and benefits of the invention shall appear clearly in the description which is given of it hereinbelow, for the purposes of information and in no way restricted, in reference to the annexed figures, among which.

For reasons of clarity, only the elements useful for understanding the invention have been shown and this, without respecting the scale and in a diagrammatical manner. Furthermore, similar elements located on different figures comprise identical references.

DETAILED DESCRIPTION

Figure 1:
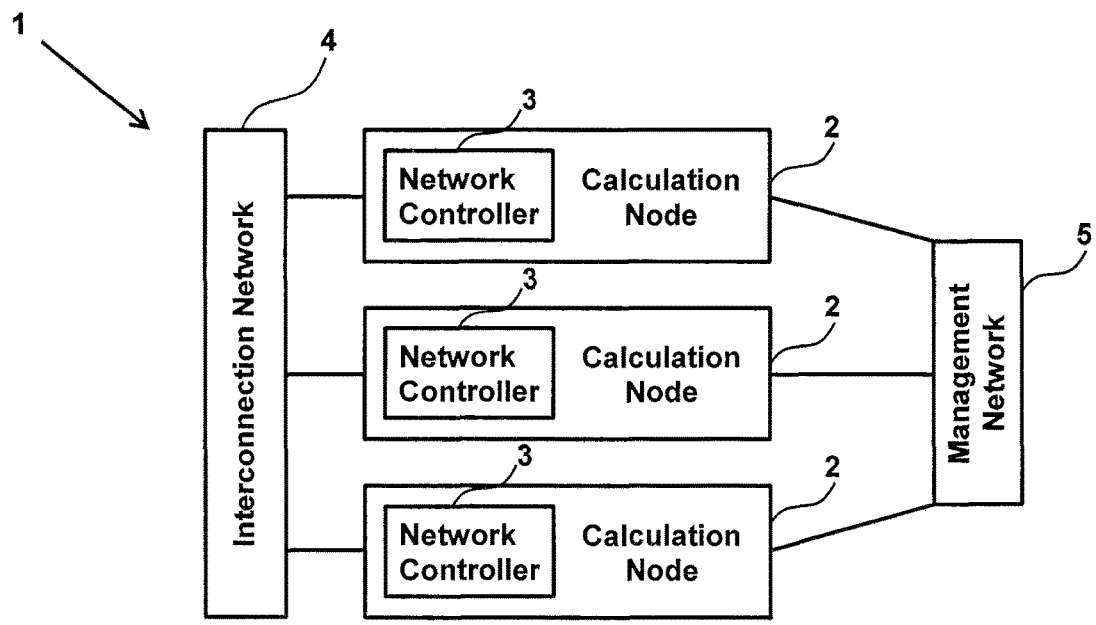
FIG. 1 shows, diagrammatically, an example of a computer of the high performance type in accordance with those of prior art.
Figure 2:
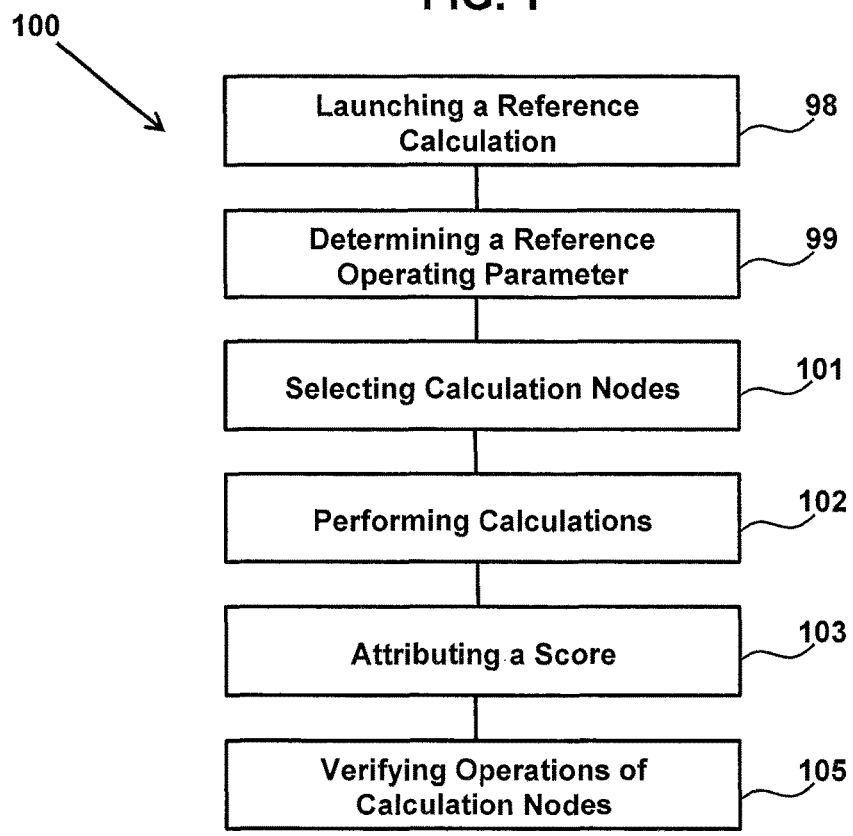
FIG. 2 shows a block diagram of a first implementation of the method for monitoring the operation of an IT infrastructure comprising a plurality of calculation nodes in accordance with an embodiment of the invention.

FIG. 2 shows a block diagram of the steps of the method 100 for monitoring the operation of an IT infrastructure comprising a plurality of calculation nodes in accordance with an embodiment the invention.

In a non-restricted implementation, the method 100 comprises a step of launching 98 a reference calculation on at least one calculation node. This step of launching 98 a reference calculation can be carried out on one, several, or all of the calculation nodes of the IT infrastructure. These calculations can be identical or different.

In an embodiment, each node is for example a server implementing an operating system such as Linux (Linux is a trademark). Each node generally comprises one or more microprocessors, one or more local non-transitory memories and a communication interface. In an embodiment, the nodes may be linked together by switches, for example, hierarchically.

The method 100 also comprises a step of determining 99 a reference operating parameter of the calculation node. When the step of launching 98 a reference calculation is carried out on all of the calculation nodes of the IT infrastructure, then a reference operating parameter is determined for each one of the calculation nodes of the IT infrastructure.

The method also comprises a step of selecting 101, via a sequencer, calculation nodes in order to perform at least one calculation. Such a sequencer is also known as a "Batch Manager". The sequencer has the visibility of all of the activity of the IT infrastructure (indifferently referred to as a computer) and is therefore constructed and arranged in order to select calculation nodes that are available in order to perform a calculation requested by a user. For example, calculation means an execution request from an application.

More generally, the sequencer makes it possible to determine which application will be executed and on which calculation nodes in such a way as to optimise the placing of the work. In other words, one of the roles of the sequencer is to allow for the execution of all of the applications at one moment or another and to best use the calculation nodes for the user.

The sequencer may include dedicated circuitry or hardware circuit components implemented to carry out its function(s). For example, in an embodiment, the sequencer includes one or more physical processors and one or more non-transitory memories encoded with machine executable instructions for carrying out or causing to carry out the function(s) of the sequencer.

The method 100 also comprises a step of performing the calculation 102 via the selected calculation nodes. A calculation can be executed on one or several calculation nodes.

The method 100 comprises a step of attributing 103, via the sequencer, of a score to each one of the calculation nodes having participated in the calculation performed. Each score reflects a difference between an operating parameter of the calculation node for which the score is attributed and a reference operating parameter of the calculation node for which the score is attributed, By way of a non-restricted example, the operating parameter (whether or not of reference) is the time taken by a calculation node 11 in order to perform a calculation (indifferently referred to an execution time), the number of errors corrected, the CPU (Central Processing Unit) user time vs. system, the use of the memory (for example, when there is a transmission problem, the packets that are not transmitted are stored in the memory and therefore the quantity of memory consumed is greater than a reference consumed quantity of memory), the number of hardware interruptions (IRQ or Interrupt ReQuest). It is understood that other types of operating parameters and reference operating parameters can be used.

In other words, at the end of each calculation, the sequencer attributes a set of scores (for example, according to the time that the calculation took with respect to a reference, to the number of errors corrected that were observed, etc.). For example, if the operating parameter monitored is the time taken by a calculation node in order to perform a calculation and this calculation time is greater than a reference time, then the sequencer will attribute a score to it that reflect a failure of this node. These scores are given to each one of the calculation nodes having participated in the calculation.

The method further comprises a step of verifying 105, via the sequencer, of the operation of the calculation nodes having participated in the calculation performed. The verifying 105 is carried out using scores attributed to all of the calculation nodes having participated in the calculation.

Figure 3:
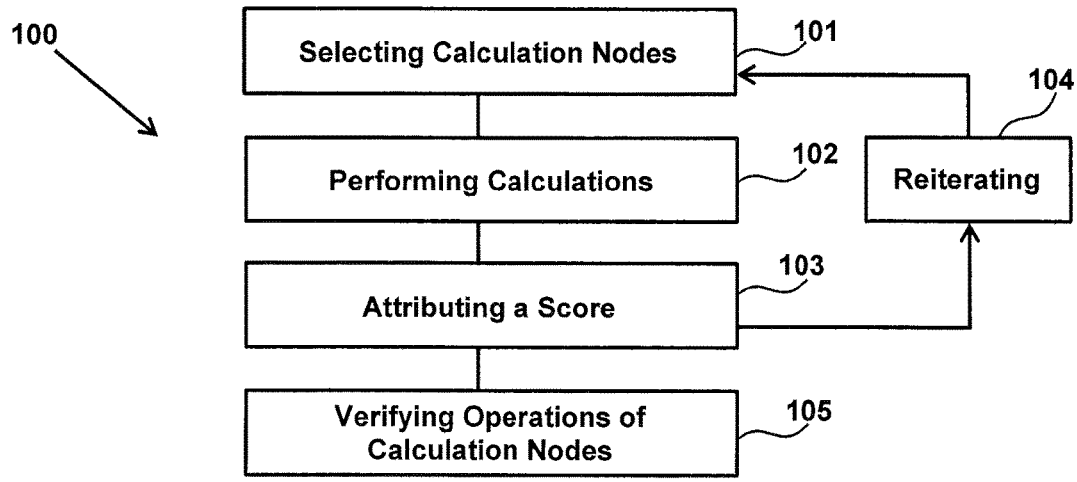
FIG. 3 shows a block diagram of a second implementation of the method for monitoring the operation of an IT infrastructure comprising a plurality of calculation nodes in accordance with an embodiment of the invention.

In an implementation of the invention shown in FIG. 3, the steps of selecting 101, performing 102 and attributing 103 are reiterated 104. As such, each one of the selected calculation nodes 11 performs a plurality of calculations and a plurality of scores is attributed to each one of the calculation nodes. For example, when a plurality of scores reflecting a plurality of operating parameters of a plurality of calculation nodes are recorded, the verification of the operation 105 can be carried out by calculating, for each calculation node, an average of the scores that were attributed for the same calculation node having performed a plurality of calculations in order to deduce from it the operation of the calculation node. In other words, aggregated statistics make it possible to reveal the slowest calculation nodes.

Figure 4:
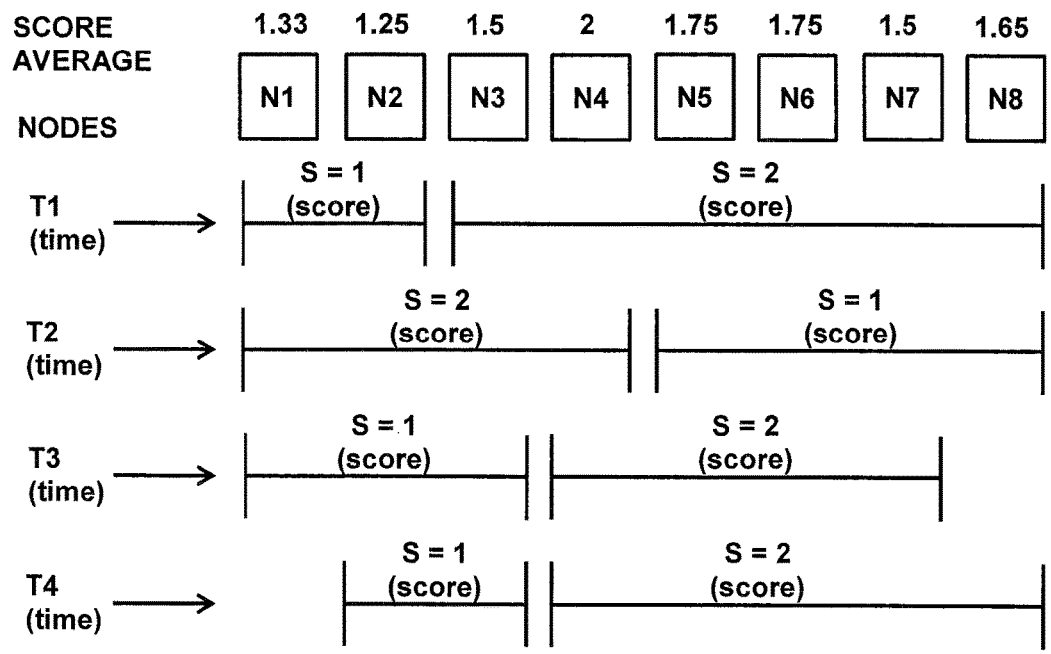
FIG. 4 shows an example of implementation of the method for monitoring the operation according to an embodiment of the invention, FIG. 5 diagrammatically shows an IT infrastructure of the high performance computer type comprising a sequencer in accordance with an embodiment of the invention.

FIG. 4 shows by way of example, the steps of attributing 103 and of verifying 105 the operation following the performing of eight calculations via eight calculation nodes of an IT infrastructure.

More particularly, in this example shown in FIG. 4, when a calculation node is operating correctly a score of 1 is attributed to it and when a calculation node is operating incorrectly a score of 2 is attributed to it. In other words, if no difference is detected between the measured operating parameter and the reference operating parameter then a score of 1 is attributed. On the contrary, when a difference is detected between the measured operating parameter and the reference operating parameter then a score of 2 is attributed.

At time T1, a first calculation is performed by calculation nodes N1 and N2 and a second calculation is performed by calculation nodes N3 to N8. A score S=1 is attributed to calculation nodes 1 and 2 while a score S=2 is attributed to calculation nodes N3 to N8.

At time T2, a third calculation is carried out by calculation nodes N1 to N4 and a fourth calculation is carried out by calculation nodes N5 to N8. A score S=2 is attributed to calculation nodes N1 to N4 while a score S=1 is attributed to calculation nodes N5 to N8.

At time T3, a fifth calculation is carried out by calculation nodes N1 to N3 and a sixth calculation is carried out by calculation nodes N4 to N7. A score S=1 is attributed to calculation nodes N1 to N3 while a score S=2 is attributed to calculation nodes N4 to N7.

At time T4, a seventh calculation is carried out by calculation nodes N2 and N3 and an eighth calculation is carried out by calculation nodes N4 to N8. A score S=1 is attributed to calculation nodes N2 and N3 while a score S=2 is attributed to calculation nodes N4 to N8.

In this case, the verifying 105 of the operation is carried out by calculating for each calculation node an average of the attributed scores S. As such, it appears that the calculation node N4 has a failure since the scores that were attributed to it for the performing of the eight calculations are constantly 2.

Figure 5:
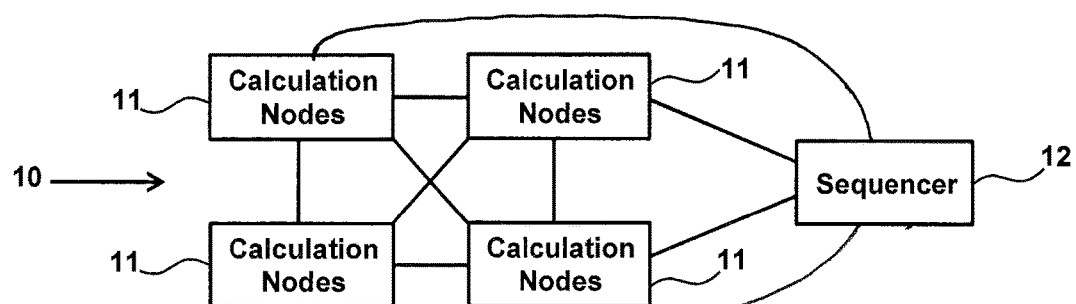

FIG. 5 diagrammatically shows an IT infrastructure 10 of the high performance computer type comprising a sequencer 12 in accordance with the invention. The IT infrastructure 10 comprises a plurality of calculation nodes 11. The sequencer 12 for monitoring is constructed and arranged in order to:

launch a reference calculation on at least one calculation node,
determine a reference operating parameter of the calculation node,
select calculation nodes 11 in order to perform a calculation,
perform the calculation via the selected calculation nodes 11,
attribute a score S to each one of the calculation nodes 11 having participated in the calculation performed, with each score S reflecting a difference between a measured operating parameter of the calculation node 11 for which the score is attributed and a reference operating parameter of said calculation node for which said score is attributed,
verify the operation of the calculation nodes 11 having participated in the calculation performed, with the verification being carried out using scores S attributed to all of the calculation nodes 11 having participated in the calculation.

Figure 6:
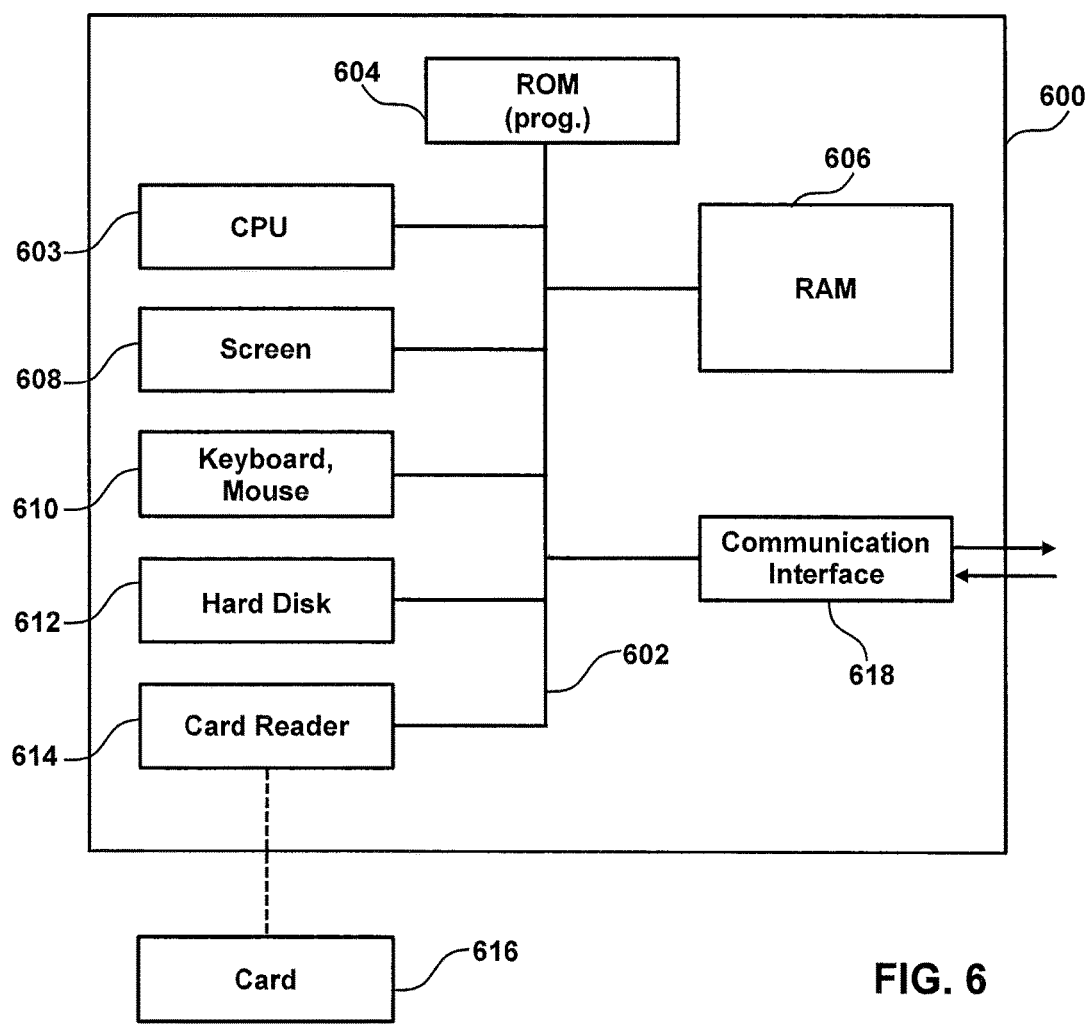
FIG. 6 is a block diagram illustrating an example of a device to implement the disclosure or part of the disclosure.

A device adapted to implement the disclosure or a part of the disclosure, in particular the algorithms described with reference to FIGS. 2-4, is illustrated in FIG. 6. The device of FIG. 6 can be used to implement at least part of the sequencer. The device 600 is for example a computer of PC type (PC standing for Personal Computer). The device 600 here comprises a communication bus 602 to which there are connected: a central processing unit or microprocessor 603 (or CPU, standing for Central Processing Unit); a read only memory 604 (ROM, acronym for Read Only Memory) able to contain the programs "frog"; a random access memory or cache memory 606 (RAM, acronym for Random Access Memory), comprising registers adapted to record variables and parameters created and modified during the execution of the aforementioned programs; and, a communication interface 718 adapted to transmit and to receive data.

In an embodiment, the device 600 furthermore possesses: a screen 608 making it possible to view data and/or serving as a graphical interface with the user who will be able to interact with the programs according to the disclosure, using a keyboard and a mouse 610 or another pointing device, such as an optical stylus, a touch screen or a remote control; a hard disk 612 able to contain the aforementioned programs "frog" and data processed or to be processed according to the disclosure; and, a memory card reader 614 adapted to receive a memory card 616 and to read or write thereon data processed or to be processed according to the disclosure.

The communication bus allows communication and interoperability between the different elements included in the device 600 or connected to it. The representation of the bus is non-limiting and, in particular, the central processing unit may communicate instructions to any element of the device 600 directly or by means of another element of the device 600.

The executable code of each program enabling the programmable device to implement the methods according to the disclosure may be stored, for example, on the hard disk 612 or in read only memory 604.

According to a variant, the memory card 616 can contain data as well as the executable code of the aforementioned programs which, once read by the device 600, will be stored on the hard disk 612.

According to another variant, it will be possible for the executable code of the programs to be received, at least partially, via the interface 618, in order to be stored in identical manner to that described previously.

More generally, the program or programs may be loaded into one of the non-transitory storage devices or media of the device 600 before being executed.

The central processing unit 603 will control and direct the execution of the instructions or portions of software code of the program or programs according to the disclosure, these instructions being stored on the hard disk 612 or in the read-only memory 604 or in the other aforementioned storage elements. On powering up, the program or programs which are stored in a non-volatile memory, for example the hard disk 612 or the read only memory 604, are transferred into the random-access memory 606, which then contains the executable code of the program or programs according to the disclosure, as well as registers for storing the variables and parameters necessary for implementation of the disclosure.

It will be appreciated by one skilled in the art that the disclosed arrangements and methods described herein represent a solution to the technological problem currently faced by designers to identify the calculation nodes that have intermittent malfunctions in high performance computers.

The present invention has been described and illustrated in this detailed description with reference to the accompanying figures. However, the present invention is not limited to the embodiments presented. Other variants and embodiments may be derived and implemented by a person skilled in the art on reading the present description and the appended figures.

In the claims, the term "comprise" does not exclude other elements or other steps. The indefinite article "a" does not exclude the plural. A single processor or several other modules may be used to implement the invention. The various features presented and/or claimed may be beneficially combined. Their presence in the description or in different dependent claims does not exclude the possibility of combining them. The reference signs should not be construed as limiting the scope of the invention.

The invention claimed is:

1. A method for monitoring an operation of an IT infrastructure comprising a plurality of calculation nodes, and an interconnection network that connects together the plurality of calculation nodes, said method comprising:
    selecting, via a sequencer, calculation nodes in order to perform at least one calculation; said sequencer being in communication with said calculation nodes via the interconnection network, said sequencer comprising a non-transitory memory encoded with instructions to implement the method for monitoring the operation of the IT infrastructure;
    performing said calculation via said selected calculation nodes;
    attributing, via said sequencer, a score to each one of the calculation nodes having participated in said calculation performed, with each score reflecting a difference between a measured operating parameter of the calculation node for which said score is attributed and a reference operating parameter of said calculation node for which said score is attributed, and
    verifying, via said sequencer, the operation of said calculation nodes having participated in said calculation performed, said verification being carried out using scores attributed to the calculation nodes having participated in said calculation.

2. The method as claimed in claim 1, further comprising, before the selecting, launching a reference calculation on at least one calculation node, and determining a reference operating parameter of said at least one calculation node.

3. The method according to claim 1, wherein the measured operating parameter and the reference operating parameter are formed by a number of errors corrected by a calculation node in order to perform a calculation.

4. The method according to claim 1, wherein the measured operating parameter and the reference operating parameter are formed by a time taken by a calculation node in order to perform a calculation.

5. The method as claimed in claim 4, wherein the selecting, performing and attributing are reiterated so that the verifying is carried out for each one of the calculation nodes using a plurality of scores attributed to each one of the calculation nodes having performed a plurality of calculations.

6. The method according to claim 5, wherein verifying is carried out by calculating, for a calculation node, an average of a plurality of scores attributed for the performing of a plurality of calculations.

7. A sequencer for monitoring the operation of an IT infrastructure, said sequencer comprising a non-transitory memory encoded with instructions to implement the method for monitoring the operation of an IT infrastructure comprising a plurality of calculation nodes and an interconnection network that connects together the plurality of calculation nodes, said method comprising:
    selecting, via the sequencer, calculation nodes in order to perform at least one calculation, said sequencer being in communication with said calculation nodes via the interconnection network;
    performing said calculation via said selected calculation nodes;
    attributing, via said sequencer, a score to each one of the calculation nodes having participated in said calculation performed, with each score reflecting a difference between a measured operating parameter of the calculation node for which said score is attributed, and reference operating parameter of said calculation node for which said score is attributed, and
    verifying, via said sequencer, the operation of said calculation nodes having participated in said calculation performed, said verification being carried out using scores attributed to the calculation nodes having participated in said calculation.

* * * * *